April 7, 1925.  1,532,681
G. S. BRYCE
TOP FOR BEVERAGE MIXERS
Filed Jan. 14, 1924
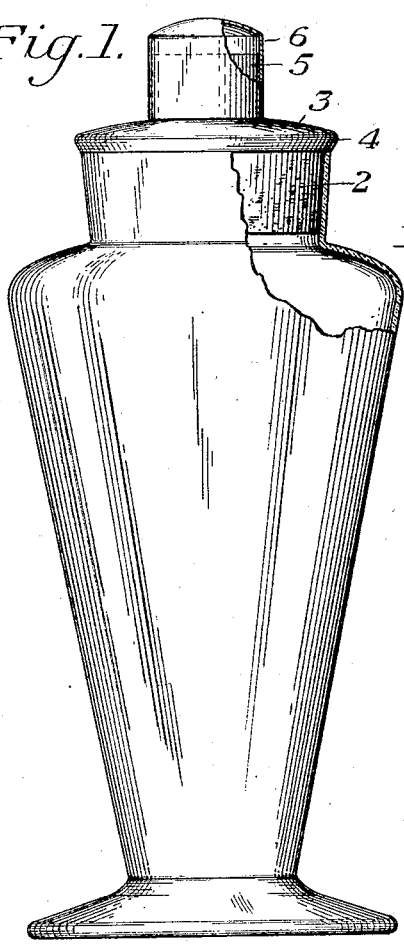
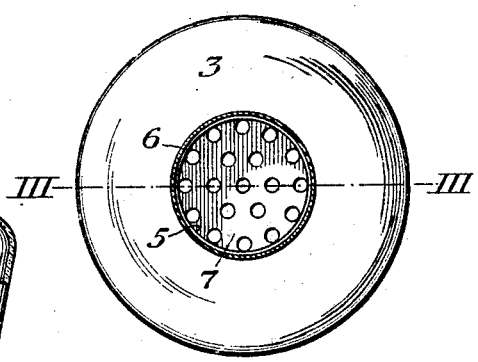
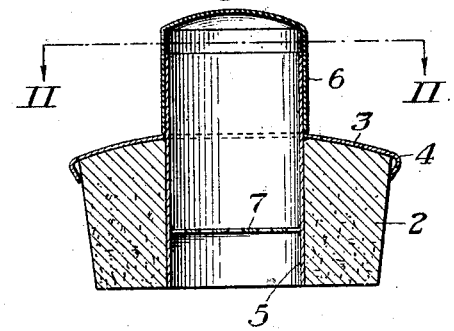
INVENTOR Patented Apr. 7, 1925.

1,532,681

UNITED STATES PATENT OFFICE.

GERARD S. BRYCE, OF MOUNT PLEASANT, PENNSYLVANIA, ASSIGNOR TO BRYCE BROTHERS COMPANY, OF MOUNT PLEASANT, PENNSYLVANIA, A CORPORATION OF PENNSYLVANIA.

TOP FOR BEVERAGE MIXERS.

Application filed January 14, 1924. Serial No. 685,977.

*To all whom it may concern:*

Be it known that I, GERARD S. BRYCE, a citizen of the United States, residing at Mount Pleasant, county of Westmoreland, and State of Pennsylvania, have invented a new and useful Improvement in Tops for Beverage Mixers, of which the following is a full, clear, and exact description.

The present invention relates to tops for vessels employed for shaking and mixing beverages. The purpose of the invention is to provide a top of this character adapted to act as a combined strainer and pouring spout, as well as to form a closure for the mixing vessel during the shaking of the contents thereof.

My invention is illustrated in the accompanying drawings, in which—

Figure 1 is a view of a beverage mixing vessel having a preferred form of top applied thereto, the mixing vessel and top being partly broken away;

Figure 2 is a sectional plan view of the top taken on the line II—II of Figure 3; and Figure 3 is a vertical sectional view taken on the line III—III of Figure 2.

My improved top comprises a cork 2 adapted to fit the mouth of a mixing vessel, such as is illustrated in Figure 1. This cork is preferably provided with a metallic sheathing 3, which may be formed of silver or any other suitable material. The sheathing has a downwardly and inwardly directed peripheral flange 4, which grips the peripheral edge wall of the cork, the flange being preferably formed by spinning the peripheral edge portion of the sheathing into engagement with the peripheral edge wall of the cork after the sheathing has been placed in position on the cork.

The cork and its sheathing are formed with a central opening to receive a spout 5 which has its lower end flush with the bottom face of the cork, but projects a substantial distance above the sheathing. This spout is preferably of cylindrical form and is secured to the sheathing in any suitable manner, as by soldering. The projecting portion of the spout is provided with a slip cover 6 to prevent leakage of the contents of the vessel during shaking thereof, and within the spout, preferably near the lower end thereof, is a perforated diaphragm 7 forming a strainer for the contents of the mixing vessel. The spout 5, cover 6 and strainer 7 may be made of the same material as the sheathing 3 if desired.

The advantages of my invention arise from the provision of a top of the above character having a pouring spout provided with a cover and having a strainer associated therewith.

While I have illustrated and described the preferred embodiment of my invention, it will be understood that changes may be made in the details of construction without departing from the spirit of the invention or scope of the appended claims.

I claim:

1. A closure of the character described, comprising a cork adapted to fit the mouth of a vessel, said cork having an opening therethrough, a plain faced spout extending through the opening in the cork, and a sheathing on top of the cork surrounding the spout, said sheathing having a downwardly and inwardly extending flange, the lower edge of the flange gripping the cork so that the upper portion of the cork is gripped between the spout and said lower edge of the flange, whereby the cork is secured against rotation relative to the spout and sheathing when the closure is applied and removed.

2. A closure of the character described, comprising a cork adapted to fit the mouth of a vessel, said cork having an opening therethrough, a plain faced spout extending through the opening in the cork, and a sheathing on top of the cork secured to the spout, said sheathing having a downwardly and inwardly extending flange, the lower edge of the flange gripping the cork so that the upper portion of the cork is gripped between the spout and said lower edge of the flange, whereby the cork is secured against rotation relative to the spout and sheathing when the closure is applied and removed.

In testimony whereof I have hereunto set my hand.

GERARD S. BRYCE.